United States Patent [19]

Mottate

[11] Patent Number: 4,909,637

[45] Date of Patent: Mar. 20, 1990

[54] LINEAR MOTION GUIDE UNIT ASSEMBLY

[75] Inventor: Tatsuo Mottate, Mitaka, Japan

[73] Assignee: Nippon Thompson, Co., Ltd., Tokyo, Japan

[21] Appl. No.: 251,608

[22] Filed: Sep. 30, 1988

[30] Foreign Application Priority Data

Oct. 1, 1987 [JP] Japan ................... 62-245752

[51] Int. Cl.⁴ .............................. F16C 29/06
[52] U.S. Cl. ....................................... 384/45
[58] Field of Search ............... 384/43, 44, 45, 451; 464/168

[56] References Cited

U.S. PATENT DOCUMENTS

| 4,582,371 | 4/1986 | Mottate | 384/45 |
| 4,647,226 | 3/1987 | Mottate | 384/45 |
| 4,778,284 | 10/1988 | Teramachi | 384/45 |
| 4,795,272 | 1/1989 | Mottate | 384/45 |

FOREIGN PATENT DOCUMENTS 909559 9/1972 Canada .................. 384/45

Primary Examiner—Thomas R. Hannon
Attorney, Agent, or Firm—Skjerven, Morrill MacPherson, Franklin & Friel

[57] ABSTRACT

A linear motion rolling contact guide unit assembly includes a U-shaped guide rail which extends straight over a desired length and which is formed with a pair of guide grooves. The assembly also includes a slider unit which is mounted in the guide rail so as to be movable relative to the guide rail along a longitudinal axis of the rail. The slider unit is formed with a pair of endless circulation paths each of which includes a load path section, a return path section and a pair of connecting path sections which connect the corresponding ends of the load and return path sections. A plurality of rolling members are provided in each of the endless circulation paths. A window is formed in the side of the slider unit at the load path section and the rolling members are partly exposed at the load path section and partly received in the corresponding guide groove of the guide rail. The slider unit includes a top plate formed with at least a part of an upper half of each of the endless circulation paths and a split bottom plate formed with the rest of the endless circulation paths.

11 Claims, 5 Drawing Sheets

LINEAR MOTION GUIDE UNIT ASSEMBLY

BACKGROUND OF THE INVENTION

1. Field of the Invention

The present invention generally relates to a linear motion rolling contact guide unit assembly, and, in particular, to a linear motion guide unit assembly including a rail extending straight over a distance, a slider unit which slidably moves straight along the rail and a plurality of rolling members interposed between the rail and the slider unit to thereby provide a rolling contact between the rail and the slider unit.

2. Description of the Prior Art

A linear motion rolling contact guide unit assembly is well known in the art, and it generally includes a rail extending straight over a desired length, a slider unit mounted on said rail for relative motion therewith and a plurality of rolling members, such as balls or rollers, interposed between the rail and the slider unit to thereby provide a sliding relative motion between the rail and the slider unit. A typical prior art linear motion rolling contact guide unit assembly is, for example, described in the earlier Japanese Patent Application No. 61-297806, which has been assigned to the assignee of this application and is hereby incorporated by reference. A U.S. Patent Application was filed in the U.S.A. on July 21, 1988 Ser. No. 07/222,605 claiming the Convention priority of the above-mentioned Japanese Patent Application No. 61-297806 and the description of the corresponding U.S. Patent Application is also hereby incorporated by reference.

Such a shell-type linear motion rolling contact guide unit assembly as shown in the above-mentioned patent application includes a guide rail which is formed from a thin metal plate by bending to have a generally U-shaped cross section including a flat bottom wall and a pair of side walls extending upright from the opposite sides of the flat bottom wall. And, a pair of guide grooves is formed one in each of the pair of opposite inner surfaces of the side walls of the guide rail, and the guide grooves extend in parallel each other and with the longitudinal axis of the guide rail. The slider unit is received in a space defined by the U-shaped guide rail for relative motion to the guide rail. The slider unit is provided with a pair of endless circulation paths, each including a straight load path section located opposite to the corresponding guide groove, a return path section and a pair of curved connecting path sections connecting the corresponding ends of the load and return path sections. A plurality of rolling members, such as balls or rollers, are provided in each of the pair of endless circulation paths so that a rolling contact is provided between the slider unit and the guide rail on opposite sides of the slider unit. That is, the rolling members located in the load path section of the slider unit come to be partly received in the corresponding guide groove of the guide rail, so that the rolling members which are partly received in the corresponding load path section and the guide groove provide a rolling contact between the guide rail and the slider unit.

However, in manufacturing such a so-called shell-type linear motion rolling contact guide unit assembly, the load path section of the slider unit was finished by plastic deformation processing or barrel processing so that the resulting load path section tended to be poor in dimensional accuracy and surface roughness. As a result, such a shell-type linear motion rolling contact guide unit assembly found applications only in drawer guides of office cabinets or the like where high precision was not required, and it could not be applied to high-precision measuring devices and audio and information processing equipment where high precision was required.

The linear motion rolling contact guide unit assembly disclosed in the above-described earlier patent application includes a slider unit which is comprised of a pair of identically structured plate-shaped slider unit halves which are fixedly combined together in a face-to-face relation. Wit this structure, the height of the slider unit may be minimized, which, in turn, contributes to make the height of the guide rail or its side walls shorter, thereby making the overall height of the assembly compact in size. In this earlier linear motion rolling contact guide unit assembly, a top or bottom half of an endless circulation path is defined in the main surface of each of the top and bottom plates, which are combined together with their main surfaces in contact o thereby define a pair of endless circulation paths therebetween.

However, although the structure shown in this earlier patent application is compact in size and it provides a high-precision type linear motion rolling contact guide unit assembly, difficulty is encountered in its manufacture. That is, in the structure shown in the earlier patent application, a feed-in port is provided at one end of the endless circulation path to thereby allow to feed a plurality of rolling members into the endless circulation path, and after insertion of a plurality of rolling members, an end plate is fitted into a gap defined between the pair of top and bottom plates to thereby plug the feed-in port. However, a linear motion rolling contact guide unit assembly of this type is normally of the size equal to or smaller than a palm of a human being and the rolling members, typically balls, have a diameter in a range between about 2 and 3 mm. Accordingly, difficulty is encountered when feeding a required number of such small-sized rolling members into the endless circulation path of the assembled slider unit.

SUMMARY OF THE INVENTION

In accordance with the present invention, there is provided a linear motion rolling contact guide unit assembly of the shell type, i.e., including a generally U-shaped guide rail comprised of a flat bottom wall and a pair of side walls extending upright from the opposite sides of the flat bottom wall, and a slider unit movably housed in the space defined by the U-shaped guide rail. In accordance with one embodiment of the present invention, the linear motion rolling contact guide unit assembly includes a guide rail having a generally U-shaped cross section and extending straight over a desired length. A pair of guiding means is provided in the guide rail, extending in parallel with the longitudinal axis of the guide rail. Preferably, the pair of guide means includes a pair of guide grooves formed in the pair of opposite side walls of the U-shaped guide rail. The present assembly also includes a slider unit which is movably located in the space defined by the U-shaped guide rail so as to be movable as guided by the pair of guiding means provided in the guide rail.

In the preferred embodiment, the slider unit includes a top plate, a bottom center plate which is fixedly attached to the central portion of the top plate and a pair of bottom end plates which are fixedly attached to the top plate each in abutment against the corresponding end of the bottom center plate. The bottom center and end plates are formed with grooves or recesses which define a pair of endless circulation paths, each including a straight load path section, a return path section and a pair of curved connecting path sections each connecting the corresponding ends of the load and return path sections, when these bottom center and end plates are combined with the top plate. Preferably, the bottom center plate is formed with the load and return path sections, and each of the bottom end plate is formed with the curved connecting path section. In one embodiment, the load and return path sections formed in the bottom center plate extend in parallel from each other.

In this manner, in accordance with the present invention, the slider unit is generally comprised of top and bottom plates, in which either of the top and bottom plates is split into two or more segments, preferably three, i.e., a center segment and a pair of end segments. Thus, such a noel structure provides a significant ease in manufacture and yet the resulting assembly has a high-precision characteristic.

In accordance with the present invention, since the bottom plate is divided into two or more parts, typically three parts, when one or more of the parts of the bottom plate is fixedly attached to the top plate, the load path section of an endless circulation path can be finished by grinding to a high precision. In one embodiment, the bottom plate is divided into three parts, i.e., a center plate formed with load and return path sections of an endless circulation path and a pair of end plates each of which is formed with a curved connecting path section of the endless circulation path, in which case the bottom center plate is first fixedly attached to the top plate and then the load path section is finished at high precision by grinding. Thus, the load path section can be finished at extremely high precision. Then, rolling members are fed, followed by the step of fixedly attaching the bottom end plates to the top plate, together with curved guide members which define an inner curved surface of the curved path section.

It is therefore a primary object of the present invention to obviate the disadvantages of the prior art as described above and to provide an improved linear motion rolling contact guide unit assembly.

Another object of the present invention is to provide a high-precision linear motion rolling contact guide unit assembly having a split-segment structure.

A further object of the present invention is to provide an improved high-precision linear motion rolling contact guide unit assembly light in weight and reliable and smooth in operation.

A still further object of the present invention is to provide a high-precision linear motion rolling contact guide unit assembly easy to manufacture and thus low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
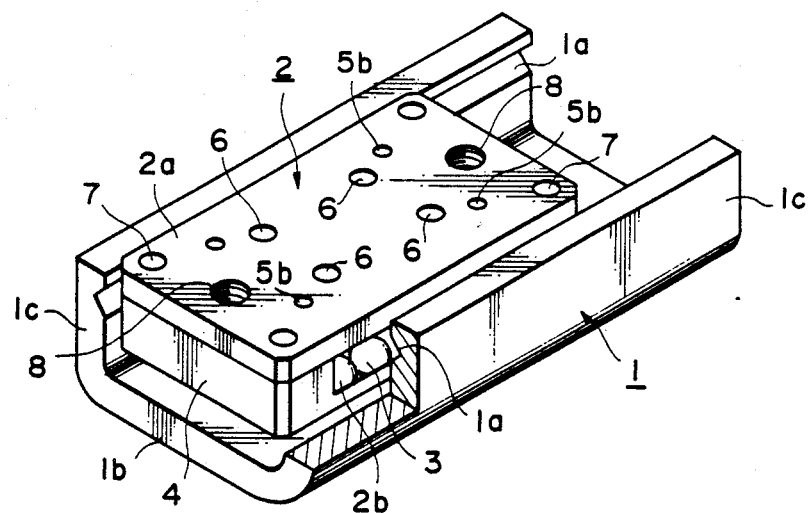
FIG. 1 is a schematic illustration showing in a cut-away perspective view a linear motion rolling contact guide unit assembly constructed in accordance with one embodiment of the present invention.

Referring now to FIG. 1, there is schematically shown a shell-type linear motion rolling contact guide unit assembly constructed in accordance with one embodiment of the present invention. As shown, the assembly includes a guide rail 1 which extends straight over a desired length along its longitudinal axis and it is formed by bending a thin metal plate so as to define a generally U-shaped cross section in a plane transverse to the longitudinal axis. Thus, the guide rail 1 has a flat bottom wall 1b and a pair of side walls 1c which extend upright from the opposite sides of the bottom wall 1b, so that the guide rail 1 has an overall shape which is similar to a trough. Each of the pair of side walls 1c is formed with a guide groove 1a at its inner surface extending in parallel with the longitudinal axis of the guide rail 1.

The assembly also includes a slider unit 2 which is located in the space defined by the U-shaped guide rail 1, and the slider unit 2 is provided to be movable relative to the guide rail 1 as guided by the pair guide grooves 1a formed in the guide rail 1 in any direction along the longitudinal axis of the guide rail 1. As will become clear later, the slider unit 2 is provided with a pair of endless circulating paths in which a plurality of rolling members 3, or balls in the illustrated embodiment, are provided. Each endless circulating path includes a load path section 8b which is defined along one side of the slider unit 2 opposite to the corresponding guide groove 1a of the guide rail 1, a return path section 8a, and a pair of connecting path sections 8c each of which connects the corresponding ends of the load and return path sections 8b and 8a, respectively. The rolling members 3 are partly exposed and partly project beyond the limit of the side of the slider unit 2 when they are located in the load path section 8b, so that the rolling members 3 somewhat project beyond the side of the slider unit 2 to be partly received in the corresponding guide groove 1a of the guide rail 1. Thus, as best shown in FIG. 2, the balls 3 are partly received in the load path section 8b of the slider unit 2 and also partly received in the guide groove 1a of the guide rail 1 so that the slider unit 2 may move relative to the guide rail 1 along the straight longitudinal axis of the guide rail 1 back and forth.

The main feature of the present invention resides in the structure of the slider unit 2. In particular, in the illustrated embodiment, the slider unit 2 is divided into upper and lower halves and the lower half is also divided into three parts. It is to be noted that either of the upper or lower half may be divided into two or more parts, if desired and thus the division into parts should not be limited only to the lower half. In the illustrated embodiment, the lower half is divided into a bottom center part and a pair of bottom end parts. Thus, in the illustrated embodiment, the slider unit 2 includes a top plate 2a and a bottom center plate 2b which is fixedly attached to the central portion of the top plate 2a and a pair of bottom end plates 4 which are fixedly attached to the end portions of the top plate 2a in an abutment relation with the end of the bottom center plate 2b. The top plate 2a is formed with the upper half of the load and return path sections 8b and 8a, respectively, of each of a pair of endless circulation paths at its bottom surface, and the lower half of the load and return path sections 8b and 8a, respectively, of each of the pair of endless circulation paths is formed in the bottom center plate 2b while each of the connecting path sections 8c is formed in the bottom end plate 4. Alternatively, the top plate 2a may be a flat plate and the pair of endless circulation paths may be formed in the bottom center and end plates 2a and 4, respectively, if desired. In the illustrated embodiment, the top plate 2a serves as a reference element based on which the position of any other associated elements is determined.

Figure 2:
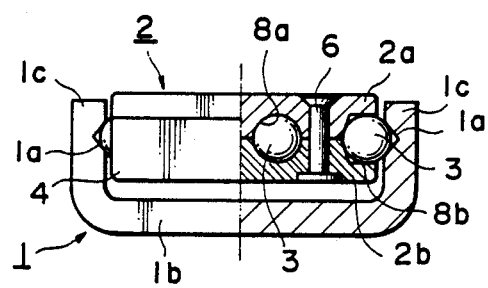
FIG. 2 is a schematic illustration showing in partial cross-sectional, front view the assembly of FIG. 1.
Figure 8:
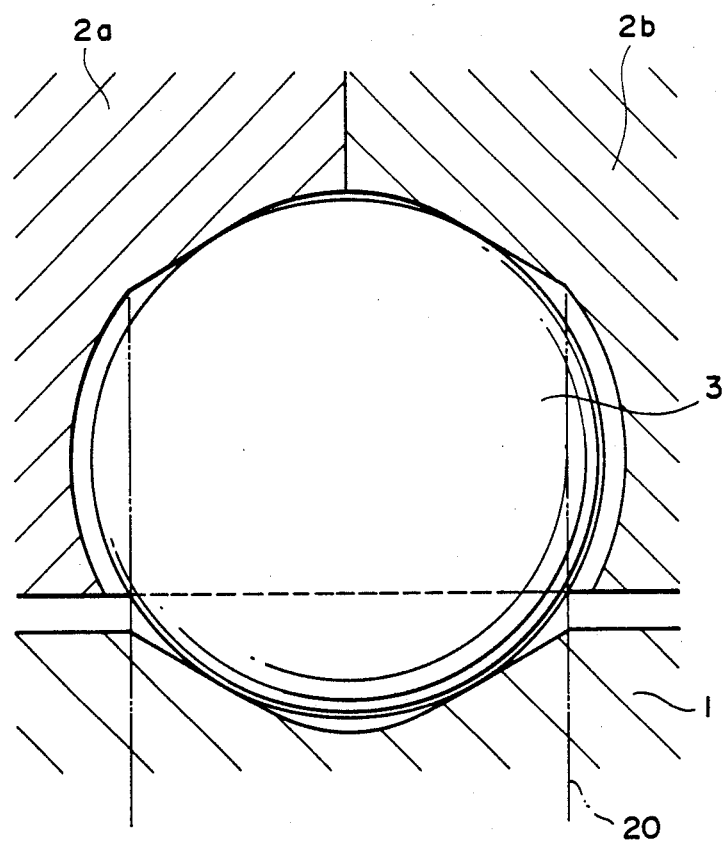
FIG. 8 is a schematic illustration showing on an enlarged scale how a ball is received partly in the load path section of the slider unit and the guide groove of the guide rail and also showing how the load path section of the slider unit is finished by grinding as indicated by the two-dotted line.

As shown in FIGS. 1 and 2, the top plate 2a and the bottom center plate 2b may be fixedly attached by means of rivets 6, though any other fixing means may also be used, if desired. With these two plates 2a and 2b fixedly attached together, use is made of a grinder 20 shown by the two-dotted line in FIG. 8 to grind the surface of the combined plates 2a and 2b, which defines the load path section 8b of an endless circulation path. Thus, the load path section can be finished extremely well at high precision by grinding in this manner. It is to be noted that an elongated window is defined at the load path section 8b of the slider unit 2, through which the balls 3 may project partly as shown in FIG. 8. However, the width of the window is sized to be somewhat smaller than the diameter of the balls 3, so that the balls 3 are prevented from slipping away from the load path section 8b through the window. As also shown in FIG. 8, the load path section is also partly defined by a curved surface which has an arc somewhat larger than that of the balls 3, and, thus, the balls 3 may advance along the load path section 8b in rolling contact therewith. The exposed portions of the balls 3 through the window of the load path section 8b are partly received in the corresponding guide groove 1a of the guide rail 1 as best shown in FIGS. 2 and 8.

Figure 3:
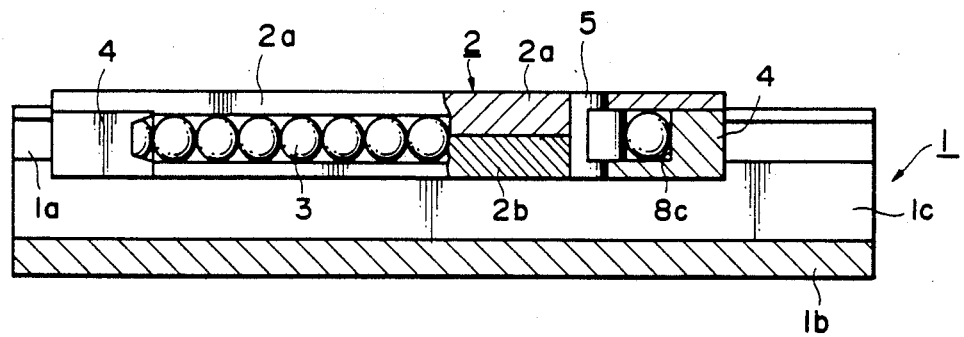
FIG. 3 is a schematic illustration showing in partial cross-sectional, side elevational view the assembly of FIG. 1.
Figure 4:
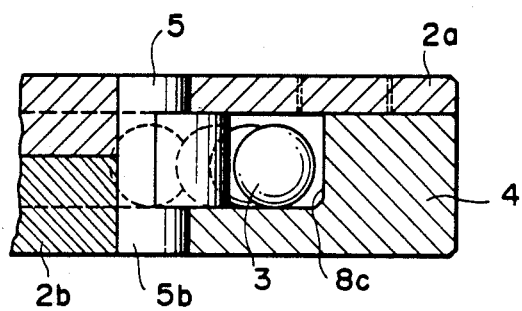
FIG. 4 is a schematic illustration showing on an enlarged scale in partial cross-sectional, fragmentary view, part of the slider unit provided in the assembly shown in FIG. 3.
Figure 5:
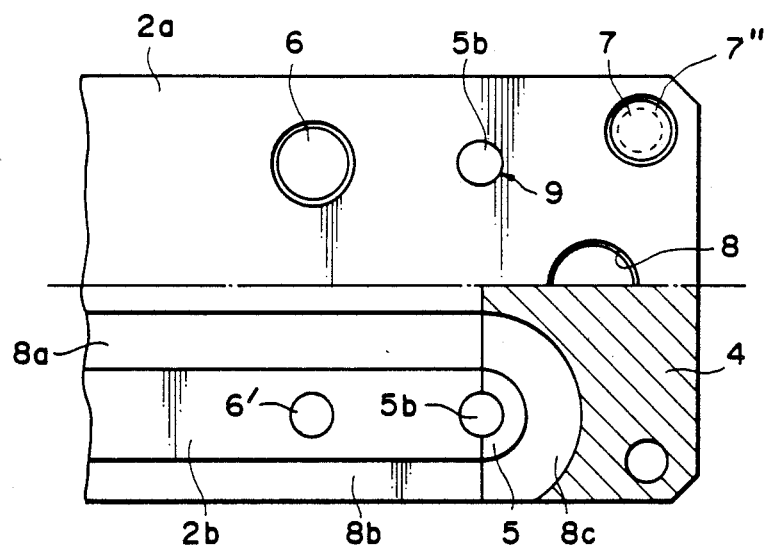
FIG. 5 is a schematic illustration showing in partial cross-sectional, fragmentary view, the structure of the slider unit provided in the assembly shown in FIG. 1.
Figure 6:
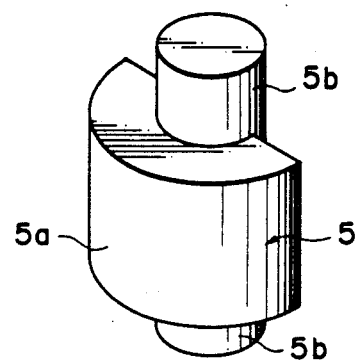
FIG. 6 is a schematic illustration showing in perspective view a curved guide member provided in the slider unit of the assembly of FIG. 1.
Figure 7:
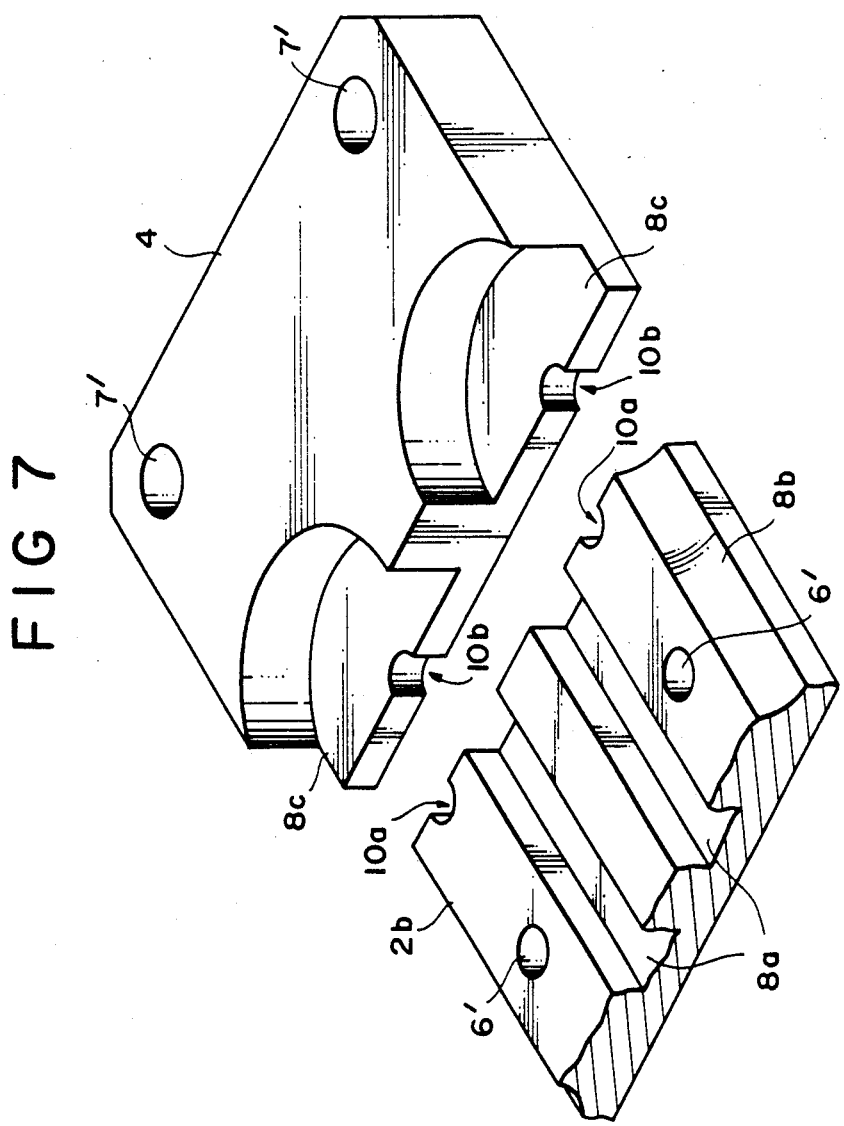
FIG. 7 is a schematic illustration showing in perspective and exploded view how the bottom center plate and the bottom end plate are combined in an abutment relation.

As shown in FIGS. 3, 4 and 7, the connecting path section 8c of each of a pair of endless circulation path is formed in the form of a recess in the bottom end plate 4 in the illustrated embodiment. The bottom end plate 4 is also formed with a notch 10b for each of the connecting path section 8c, which is in registry in location with a cooperating notch 10a formed in the end of the bottom center plate 2b. Thus, when the bottom end plate 4 is combined with the bottom center plate 2b in an abutment relation, the pair of cooperating notches 10a and 10b are located opposite to each other to thereby define a mounting hole, into which a bottom end portion 5b of a curved guide member 5 shown in FIG. 6 may be snugly fitted. On the other hand, as shown in FIG. 5, the top plate 2a is formed with a mounting hole 9 in registry in location with a corresponding mounting hole defined by the cooperating notches 10a and 10b, and a top end portion 5b of the curved guide member 5 is snugly fitted into the mounting hole 9 of the top plate 2a. In this manner, the curved guide member 5 may be set in position. As shown in FIG. 6, since the curved guide member 5 is provided with a semicylindrical portion 5a, when the curved guide member 5 is set in position as described above, the semicylindrical portion 5a presents a curved surface which defines the inner curved surface of the connecting path section 8c of the corresponding endless circulation path. As alternative embodiments, the curved guide member 5 may be formed integrally either with the bottom center plate 2b or the bottom end plate 4, if desired.

The top plate 2a is formed with a plurality of mounting holes 9 into each of which the top end portion 5b of the curved guide member 5 may be fitted. The top plate 2a is also formed with a plurality of mounting holes 6' and the bottom center plate 2b is also formed with a plurality of corresponding mounting holes 6' so that the top and bottom center plates 2a and 2b may be fixedly attached together by rivets 6 fitted into the cooperating mounting holes 6' of the top and bottom center plates 2a and 2b. The top plate 2a is also formed with another set of mounting holes 7" and the bottom end plate 4 is formed with a plurality of corresponding mounting holes 7'. Thus, the end plate 4 may be fixedly attached to the top plate 2a through rivets 7 fitted into the cooperating mounting holes 7' of the top and bottom end plates 2a and 4. The top plate 2a of the slider unit 2 is also formed with a plurality of threaded mounting holes 8 which may be used to fixedly attach the slider unit 2 to any other desired object by means of bolts.

In the above-described embodiments, use was made of balls 3 as rolling members, but use may also be made of rollers, if desired. The top and bottom center and end plates may be made of a metal, such as alloy steel, fine ceramics, resin, or plastics. In the preferred embodiment, the top and bottom center plates 2a and 2b are made of a metal, such as alloy steel, and the end plates 4 are made of a synthetic resin.

As described above, in accordance with the present invention, since the bottom end plates 4 formed with the connecting path section 8c of an endless circulation path for rolling members are separate from the bottom center plate 2b which is formed with the load and return path sections of the endless circulation path, the load path section is defined when the bottom center plate 2b is fixedly attached to the top plate 2a and the load path section can be finished at high precision, for example, by grinding. Then, the rolling members can be inserted and the bottom end plates can be fixedly attached to the top plate after positioning the curved guide member in position to thereby complete the manufacture of the slider unit. Since the slider unit 2 is relatively thin in its overall thickness, it may be made relatively compact in size and light in weight. Thus, even if the top and bottom center plates 2a and 2b are made of a metal, such as alloy steel, in order to attain a high precision load path section, the overall weight of the slider unit 2 can be maintained low. Besides, since even if the bottom center plate 2b is made of a metal, the bottom end plates 4 may be made of a synthetic resin or plastic material, the overall weight of the slider unit 2 may be maintained at a relatively low level. It should also be noted that the top plate 2a may be so structured that its bottom surface is formed with the upper half of an endless circulation path, or the top plate 2a may be a flat top plate in which no part of an endless circulation path is formed. In the former case, the lower half of an endless circulation path is formed in the bottom center and end plates 2b and 4 as divided. In the latter case, the entire endless circulation path is defined in the bottom center and end plates 2b and 4 as divided and the top plate 2a only defines the top surface of the endless circulation path.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit assembly comprising:
   a U-shaped guide rail having at least one guiding means extending in parallel with a longitudinal axis of said guide rail;
   a slider unit mounted in said U-shaped guide rail so as to be movable relative to said guide rail in a direction of said longitudinal axis as guided by said guiding means, said slider unit including a top plate and a bottom plate which is fixedly attached to said top plate to thereby define at least one endless circulation path, which includes a load path section, a return path section and a pair of connecting path sections connecting the corresponding ends of said load and return path sections, therebetween, at least one of said top and bottom plates being divided into two or more sections, said load path section being defined as a recess formed along one side of said slider unit when said top and bottom plates are attached together; and
   rolling members fitted in said endless circulation path, said rolling members partly projecting out of said slider unit when located at said load path section to thereby be partly received in said guiding means of said guide rail.

2. The assembly of claim 1, wherein said top plate is a single plate and said bottom plate is divided into three sections, including a bottom center plate which is fixedly attached to a central portion of said top plate and a pair of end plates which are fixedly attached to end portions of said top plate in an abutment relation with said bottom center plate.

3. The assembly of claim 2, wherein said top plate is formed with an upper half of said load and return path sections of said endless circulation path and the rest of said endless circulation path is formed in said bottom center and end plates.

4. The assembly of claim 2, wherein said top plate is formed with an upper half of said endless circulation path and the rest of said endless circulation path is formed in said bottom center and end plates.

5. The assembly of claim 2, wherein said load path section is finished at high precision by grinding with said top plate and said bottom center plate fixedly attached together.

6. The assembly of claim 2, further comprising a separate curved guide member having a curved surface to define an inner surface of said connecting path section.

7. The assembly of claim 2, wherein said slider unit is formed with an elongated window at said load path section and said rolling members are partly exposed through said window when located at said load path section to be partly received in said guiding means f said guide rail.

8. The assembly of claim 7, wherein said window has a width smaller than a largest size of each of said rolling members to thereby prevent said rolling members from slipping away from said load path section through said window.

9. The assembly of claim 8, wherein said load path section has a surface which defines an arc in cross section, and said arc defined by the surface of said load path section is slightly larger than an arc defined by each of said rolling members, thereby allowing said rolling members to travel along said load path section in a rolling manner.

10. The assembly of claim 1, wherein said guiding means of said guide rail includes at least one guide groove formed in an inner surface of said U-shaped guide rail.

11. A linear motion rolling contact guide unit assembly comprising:
    a U-shaped guide rail having at least one guiding means extending in parallel with a longitudinal axis of said guide rail;
    a slider unit mounted in said U-shaped guide rail so as to be movable relative to said guide rail in a direction of said longitudinal axis as guided by said guiding means, said slider unit including a substantially flat top plate and a substantially flat bottom plate which is fixedly attached to said top plate to thereby define at least one endless circulation path, which includes a load path section, a return path section and a pair of connecting path sections connecting the corresponding ends of said load and return path sections, therebetween, at least one of said top and bottom plates being divided into two or more sections;
    said load path section being defined by a longitudinally extending recess in a longitudinal peripheral linear edge of at least one of said top and bottom plates; and
    rolling members fitted in said endless circulation path, said rolling members partly projecting out of said slider unit when located at said load path section to thereby be partly received in said guiding means of said guide rail.

* * * * *